(12) United States Patent
Sekar

(10) Patent No.: US 7,846,283 B2
(45) Date of Patent: *Dec. 7, 2010

(54) METHODS FOR MANUFACTURING A PAINT ROLLER WITH PERFORATED SUBSTRATE

(76) Inventor: Chandra Sekar, 4 Sunset Rd., Searington, NY (US) 11507

( * ) Notice: Subject to any disclaimer, the term of this patent is extended or adjusted under 35 U.S.C. 154(b) by 90 days.

This patent is subject to a terminal disclaimer.

(21) Appl. No.: 12/147,476

(22) Filed: Jun. 26, 2008

(65) Prior Publication Data

US 2009/0321007 A1      Dec. 31, 2009

(51) Int. Cl.
*B65H 81/00*      (2006.01)
*B32B 37/00*      (2006.01)

(52) U.S. Cl. .................... 156/94; 156/192; 156/191; 156/244.13; 156/252

(58) Field of Classification Search ................ 156/190, 156/191, 192, 195, 244.13, 252, 94
See application file for complete search history.

(56) References Cited

U.S. PATENT DOCUMENTS

| | | | |
|---|---|---|---|
| 2,255,887 A | 9/1941 | Katz | |
| 2,331,969 A | 10/1943 | Friedrichs et al. | |
| 2,411,842 A | 12/1946 | Adams | |
| 2,422,842 A | 6/1947 | Molyneux et al. | |
| 2,789,075 A | 4/1957 | Stahl | |
| 2,806,803 A | 9/1957 | Thackara et al. | |
| 2,948,200 A | 8/1960 | Westerbarkey | |
| 3,018,212 A | 1/1962 | Chinn | |
| 3,126,306 A | 3/1964 | Sherman | |
| 3,226,799 A | 1/1966 | Grodberg et al. | |
| 3,274,905 A | 9/1966 | Demsey, Jr. et al. | |
| 3,366,719 A | 1/1968 | Lueders | |
| 3,411,931 A | 11/1968 | Burns et al. | |
| 3,429,522 A | 2/1969 | Cunningham et al. | |
| 3,430,543 A | 3/1969 | Cunningham et al. | |
| 3,457,130 A | 7/1969 | Morrison | |
| 3,460,445 A | 8/1969 | Ried | |
| 3,518,970 A | 7/1970 | Burns et al. | |
| 3,607,492 A | 9/1971 | Keith et al. | |
| 3,620,869 A | 11/1971 | Stump et al. | |
| 3,687,778 A | 8/1972 | Cichoski et al. | |
| 3,700,520 A | 10/1972 | Hielema | |

(Continued)

FOREIGN PATENT DOCUMENTS

DE      1928269      12/1970

(Continued)

*Primary Examiner*—Jeff H Aftergut
(74) *Attorney, Agent, or Firm*—Greenberg Traurig LLP

(57) ABSTRACT

A method for reducing cost and weight in paint roller manufacturing processes and other continuous processes for producing tubular goods from polymers. The method may utilize a perforated substrate such as a perforated polypropylene strip or may include a perforating step which removes overage from an unperforated substrate. The perforated substrate is fed onto a mandrel to form a tube. Adhesive is applied upon the outer surface of the perforated substrate. A cover may be applied about the tube, and the resulting product is then cut into finished-size paint rollers. The removal of the overage results in a reduction in the weight of the paint roller. In certain embodiments the overage from a perforation step is collected, and may be reused in a subsequent implementation of the method or resold.

20 Claims, 13 Drawing Sheets

U.S. PATENT DOCUMENTS

| | | | |
|---|---|---|---|
| 3,761,335 | A | 9/1973 | Cichoski et al. |
| 3,960,624 | A | 6/1976 | Erlandson |
| 4,010,054 | A | 3/1977 | Bradt |
| 4,078,957 | A | 3/1978 | Bradt |
| 4,100,007 | A | 7/1978 | Van Zeeland |
| 4,165,956 | A | 8/1979 | Hendy |
| 4,191,792 | A | 3/1980 | Janssen |
| 4,192,697 | A | 3/1980 | Parker et al. |
| 4,204,447 | A * | 5/1980 | Slaughterbeck ............ 83/171 |
| 4,678,526 | A * | 7/1987 | Hawerkamp ............... 156/195 |
| 4,689,003 | A | 8/1987 | Schreiner et al. |
| 4,692,975 | A | 9/1987 | Garcia |
| 5,137,595 | A | 8/1992 | Garcia |
| 5,146,646 | A | 9/1992 | Langford et al. |
| 5,195,242 | A | 3/1993 | Sekar |
| 5,206,968 | A | 5/1993 | Bower et al. |
| 5,273,604 | A | 12/1993 | Garcia |
| 5,294,276 | A | 3/1994 | Linn et al. |
| 5,397,414 | A | 3/1995 | Garcia et al. |
| 5,398,409 | A | 3/1995 | Sekar |
| 5,468,207 | A | 11/1995 | Bower et al. |
| 5,537,745 | A | 7/1996 | Musch et al. |
| 5,572,790 | A | 11/1996 | Sekar |
| 5,614,047 | A | 3/1997 | Garcia |
| RE35,526 | E | 6/1997 | Garcia |
| 5,694,688 | A | 12/1997 | Musch et al. |
| 5,862,591 | A * | 1/1999 | Kulkaski ............... 29/895.211 |
| 6,145,196 | A | 11/2000 | Ripstein |
| 6,159,134 | A | 12/2000 | Sekar |
| 6,159,320 | A | 12/2000 | Tams et al. |
| 6,175,985 | B1 | 1/2001 | Chambers et al. |
| 6,176,956 | B1 | 1/2001 | Hansen |
| 6,199,279 | B1 | 3/2001 | Humphrey et al. |
| 6,203,648 | B1 | 3/2001 | Barton et al. |
| 6,231,711 | B1 | 5/2001 | Roberts et al. |
| 6,254,710 | B1 | 7/2001 | Sekar |
| 6,539,999 | B2 | 4/2003 | Polzin et al. |
| 6,660,118 | B2 | 12/2003 | Tams et al. |
| 2001/0015252 | A1 | 8/2001 | Tams et al. |
| 2002/0139228 | A1* | 10/2002 | Johnston et al. ............. 83/13 |
| 2004/0052889 | A1 | 3/2004 | Nespoli |
| 2007/0056132 | A1 | 3/2007 | Yamaguchi et al. |
| 2008/0196821 | A1* | 8/2008 | Hazantonis et al. ......... 156/188 |

FOREIGN PATENT DOCUMENTS

| | | |
|---|---|---|
| DE | 4007240 | 10/1990 |
| EP | 0069335 | 1/1983 |
| EP | 0744275 | 11/1996 |
| ES | 2010431 | 11/1989 |
| ES | 2020431 | 8/1991 |
| FR | 2093060 | 1/1972 |
| JP | 5391544 | 8/1978 |
| JP | 5519511 | 2/1980 |
| JP | 6327234 | 2/1988 |
| JP | 6327238 | 8/1988 |
| JP | 2-76729 A * | 3/1990 |

* cited by examiner

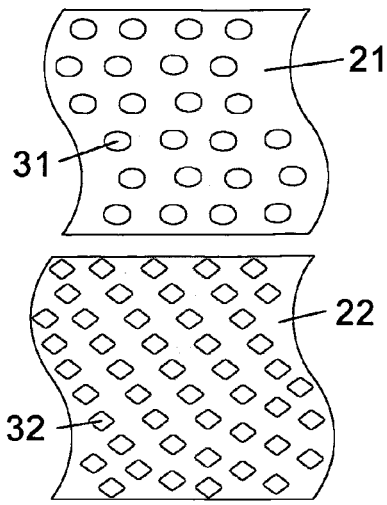
FIG. 2
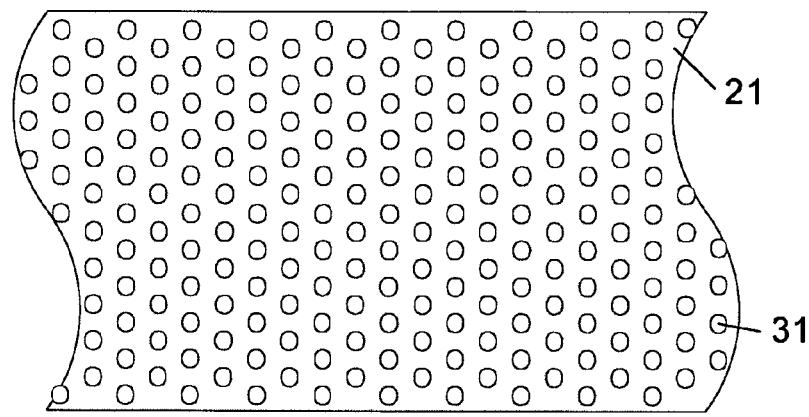
FIG. 3
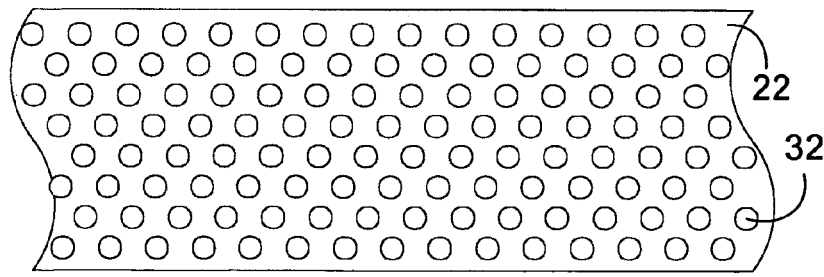
FIG. 4
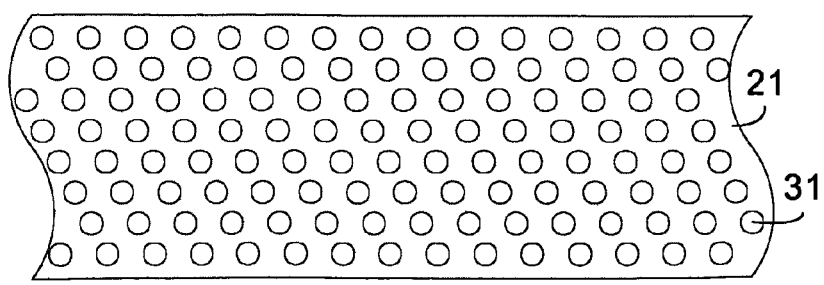

METHODS FOR MANUFACTURING A PAINT ROLLER WITH PERFORATED SUBSTRATE

This application includes material which is subject to copyright protection. The copyright owner has no objection to the facsimile reproduction by anyone of the patent disclosure, as it appears in the Patent and Trademark Office files or records, but otherwise reserves all copyright rights whatsoever.

FIELD OF THE INVENTION

This invention pertains to a method and apparatus for making paint rollers of the type used for applying paint to walls and the like. More specifically, the invention pertains to a method and apparatus for making paint rollers formed in a continuous process from perforated strips.

BACKGROUND OF THE INVENTION

Paint rollers are widely used by professionals and amateurs for applying paint to walls, ceilings, and other surfaces. Typically the roller is used with an applicator having a handle terminating in a rotatable member to which the roller is secured. The roller itself generally comprises a paint absorbing and spreading cover affixed to a generally cylindrical core. The covers may be made from materials such as wool or polyester, and other cover materials that are well known in the art.

Years ago paint rollers were manufactured using a paper or chipboard core. Some manufacturers still make such paper core paint rollers. The manufacture of such cores is well known. Such cores, however, and the paint rollers made out of them, would often fall apart during use or during cleaning, especially during cleaning with paint solvents (such as, for example, turpentine or mineral spirits, such paint solvents are well known in the art). It has always been desirable, and still remains desirable, to make the paint roller resistant to paint solvents.

An advance in making paint rollers came when the paper cores were replaced with phenolic cores, that is, cores made from paper impregnated with phenolic. Such paint rollers withstood exposure to paint solvents much better than their paper or chipboard counterparts. The process of manufacturing phenolic cores is also well known. For example, according to one known technique, a reusable disposable roller is made by first feeding three phenolic impregnated paper strips at an angle to a mandrel for overlapping, helical winding to form an endless core. Typically, the phenolic strips are supplied in rolls that can be mounted on spindles for continuous feeding, and a continuous thermosetting glue is applied to the outer surfaces of the strips as they feed off the rollers such that the strips adhere together as they are helically wound to form the core. As the endless core is belt driven down the line, the core is heated in a multi-stage infrared heater, after which a hot melt glue is applied to the core's outer surface and a continuous strip of the cover material, such as polyester, is helically wound on to the core where it is secured by the hot melt. All that remains is to cut the resulting endless roller down to usable sizes, which is usually accomplished in two steps, first using a fly away cutter to cut, e.g., 65 inch stock, and then using another cutter to cut the stock into usable lengths of, e.g., seven or nine inches.

The obvious drawback of reusable cores formed in this manner is that they require a long assembly line, due to the need of a heater, and because the phenolic must be heated to a predetermined temperature, there is an obvious trade off between the number of heater stages and the speed of the line. Additionally, while the resulting rollers are termed reusable because they do not separate when placed in paint solvents, any prolonged exposure to such solvents, does result in breakdown of the paint roller and/or separation of the layers. Moreover, the manufacturing process for making phenolic core rollers is environmentally unfriendly.

Another reusable roller is disclosed in U.S. Pat. No. 4,692,975 issued to Garcia, wherein the roller is formed using a preformed core made of thermoplastic (e.g. polypropylene) tubular stock. In particular, the process disclosed mounting a preformed core on a rotating spindle, providing a carriage movable in a direction parallel to the spindle, and providing on the carriage a direct heat source and, at an angle to the spindle a continuous strip of fabric. The disclosed process consisted of igniting the direct heat source to begin heating the outer surface of the tubular stock and moving the carriage parallel to the spindle in timed relation to the spindle's rotation so that the fabric strip is wound on the heated portion of the plastic core in a tight helix. The heated portion of the plastic core was thereby heat-softened just in advance of the point where the fabric strip is applied, such that the fabric is bonded to the core as it is wound thereon. In effect, a portion of the polypropylene core surface is used as the bonding adhesive. One advantage of the roller disclosed in the Garcia patent is that the bond formed between cover and core is a strong one not easily subject to separation from exposure to paint solvents. Another advantage is that the manufacturing process does not require the application of a separate adhesive to bond the cover to the core. There are, however, drawbacks. For one, while prior art techniques use rolls of, e.g., chipboard or paper, the Garcia process requires preformed thermoplastic tubular cores which are considerably bulkier than rolls, more expensive to transport, and more difficult to handle. Another drawback is the anticipated speed limit of the Garcia process dictated by the necessity that the heater, which advances along the core just in front of the fabric strip, move slow enough to insure softening of the polypropylene core, in the absence of which the fabric cover will not bond. In addition, the application of direct heat to the preformed polypropylene core presents manufacturing hazards from the heat source and from the fumes and/or chemicals released during the heating process.

U.S. Pat. No. 5,195,242, which is incorporated herein by reference in its entirety, issued to the present inventor and resolved many of the foregoing problems by (i) forming the thermoplastic core on the fly instead of using preformed cores, and (ii) using preheated thermoplastic as a glue, both to form the core by applying it between the strips forming the core, and to affix the cover to the core by applying it to the outside of the core before wrapping the cover thereabout. The patent describes a process involving the wrapping of three strips of thermoplastic material (preferably polypropylene) around a mandrel in overlapping relation to form a core, the strips making the core are bonded together by applying a liquefied thermoplastic material (again, preferably polypropylene) thereto prior to wrapping them about the mandrel. After the core is thus formed a liquefied thermoplastic (again, preferably polypropylene) is applied to the outer surface of the core, and a cover wrapped thereupon. All that remains, as is well known, is to cut the resulting endless roller down to usable sizes, which, as described above may be accomplished in two steps, first using a fly away cutter to make longer lengths, and then using another cutter to cut the stock into usable lengths. While this process was capable of making high quality rollers that were substantially unaffected by paint solvents, the process involved the use of multiple strips of thermoplastic material and numerous points of application for liquefied thermoplastic. As a result, the process was difficult to set up, and required many continuous adjustments in its operation.

U.S. Pat. No. 5,468,207 issued to Bower discloses a continuous process using direct heat to bond the surface of the thermoplastic plastic strips instead of applying liquefied thermoplastic to the strips to bond them together. Bower also discloses using direct heat to the surface of the core to bond the cover rather than applying liquefied thermoplastic prior to applying the cover.

U.S. Pat. No. 5,572,790, which is incorporated herein by reference in its entirety, also issued to the present inventor, and resolved some of the complexity problems of the foregoing process. Under this process, which has become the de facto standard for roller manufacturing today, instead of forming a core by winding a plurality of strips in overlapping relation about a mandrel, and then affixing a cover thereto, it was disclosed to wind only a single strip about the mandrel, the adjacent edges thereby placed in a closely-spaced or abutting relation. A liquefied thermoplastic material (preferably, polypropylene) is then applied to the exposed surface of the wound strip, and a roller is formed by helically winding the cover over the liquefied material and the wound strip with sufficient tensile force so that the fabric cover lays smoothly thereupon. Again, as with other endless roller manufacturing, a fly-away cutter may be first used to cut the product into longer lengths, and then such lengths may be cut to usable lengths. This process represented an advance over the previous method invented by the present inventor because the entire paint roller was formed in a single step which made the assembly line easier to manage as there was only a single strip of material and a single application of liquefied thermoplastic. The resulting roller, however, is somewhat inferior. More specifically, a defect present in all such rollers, manifests itself as a weak point, often sticking out from the ends of a cut roller, or making the ends of the cut roller appear "out of round." This results from the high tension memory of the strip which tends toward unwinding or toward "open" with high hoop strength. Moreover, to achieve the desirable hardened feel of the multi-layer rollers, the single strip rollers are generally made using a thicker plastic strip. The thicker the plastic strip used, (especially in relation to the diameter of the core) the more pronounced the memory effect appears on the roller.

Another process for manufacturing thermoplastic paint rollers was disclosed in U.S. Pat. No. 5,862,591, which discloses another method of forming a paint roller in a single step. In this process, strips of thermoplastic are not used, and instead, a fluidized polypropylene is applied directly to a mandrel, and a cover is placed thereupon. The application of fluidized polypropylene to a mandrel has concomitant complications in synchronization and in the problems inherent in working with consistency of application of a fluidized layer in forming a polypropylene core. Like this process, other proposals have been made for placing the pile fabric on a heated core, as for example in French Patent Publication 2,093,060, in which pile fabric is placed on a hot, freshly extruded core. It is, however, believed that no such systems have the difficulties associated with controlling the shrinkage variation which inevitably occurs in the matching of what is essentially a through heated core blank or strip blank and a cold (i.e., room temperature, for example) pile fabric.

U.S. Pat. No. 6,159,134, which is incorporated herein by reference in its entirety, also issued to the present inventor, and represented an advance for making paint rollers having thermoplastic cores and a fully integrated cover that are formed in a single-step continuous process from two polypropylene strips. Under this process, two strips of thermoplastic material are helically advanced about each other around a mandrel in an offset relation. Then, a cover is helically advanced about the second strip while providing an adhesive between the first strip and the second strip and between the outer surface of the strips and the cover. A continuous laminated paint roller is formed by applying a compressive force upon the cover.

SUMMARY OF THE INVENTION

In one embodiment a method is provided for producing a light and inexpensive paint roller. The method includes the following steps to create a paint roller: feeding a perforated substrate that has holes about a mandrel so it may be used as a paint roller core; applying adhesive upon the outer surface of the perforated substrate; applying and bonding a cover about the perforated substrate so that the adhesive on the outer surface of the perforated substrate is covered; and, applying a compressing force upon the cover urging it toward the perforated substrate. For certain embodiments, the perforated substrate may be a perforated polypropylene strip.

Another embodiment includes a method that comprises the steps of: perforating and removing an overage from a raw substrate; collecting the overage; feeding the processed substrate onto a mandrel; and, applying and bonding a cover about the paint roller core. While the removal of the overage results in a reduction in the weight of the paint roller, the strength of the paint roller is not detrimentally compromised by the removal of the overage in certain embodiments. Furthermore, the overage is reusable in a subsequent implementation of the method. Some embodiments also include the step of reclaiming the overage so that the overage may be reused in the subsequent implementation of the method. Other embodiments may include the step of selling the overage in order to recoup a portion of the expense spent for producing the paint roller.

For some embodiments, the raw substrate is a polypropylene strip and the overage is a polypropylene byproduct. Such embodiments may perform the step of removing the polypropylene byproduct from the polypropylene strip by perforating the polypropylene strip. The perforated strip would have a plurality of holes. In addition, the polypropylene byproduct would comprise of the removed portion of the polypropylene strip which was removed from where the holes are located on the polypropylene strip.

Embodiments of the method include a perforation step wherein the polypropylene strips are fed through a perforator. Certain embodiments may include a rotary die comprising one cylinder with punches/spikes and another cylinder with corresponding apertures. As, the strips pass between the two cylinders, the points of the punches/spikes pierce through the strips and enter into the apertures. As a result, the strips are perforated and the overage is collected.

In these embodiments, the step of collecting the overage may include vacuuming the polypropylene byproduct. The polypropylene byproduct may be produced and collected as the polypropylene strips pass through the rotary die and the punches/spikes pierce through the polypropylene strips. A vacuum may be placed adjacent to the second cylinder of the rotary die. As described above, the collected byproduct may be reclaimed or sold.

According to certain embodiments, the step of feeding the processed substrate onto the mandrel includes the following steps: feeding a first perforated strip of polypropylene about the mandrel; feeding a second perforated strip of polypropylene about the first perforated strip of polypropylene in offset relation; and applying adhesive. The adhesive may be applied to a portion of the outer surface of one wind of the first perforated strip, an adjacent portion of the outer surface of a subsequent wind of the first perforated strip, and substantially all of the outer surface of a wind of the second perforated strip.

In addition, these embodiments may also apply and bond the cover by feeding a cover about the second perforated strip and applying a compressing force upon the cover. This urges the cover toward the second perforated strip and simultaneously urges the second perforated strip toward the first perforated strip, thereby creating the paint roller. The embodiments may also include the step of cutting the paint roller into lengths.

Some of the embodiments also align the first perforated strip and the second perforated strip. The holes of the first perforated strip may overlie the holes of the second perforated strip. Embodiments may include any percentage of overlap concerning the holes of the first perforated strip with the holes of the second perforated strip. Certain embodiments may include less than 50% of overlap.

According to some embodiments, the diameter of each hole is approximately 0.125 inches. In addition, there may be approximately 6 holes staggered across the width of perforated strips.

The embodiments may provide that holes of the first perforated strip are spaced at a predetermined interval along the longitudinal axis of the first perforated strip. Also, the holes of the second perforated strip may be spaced at a corresponding interval along the longitudinal axis of the second perforated strip. The corresponding interval of the holes of the second perforated strip may be a multiple of the predetermined interval of the holes of the first perforated strip. Furthermore, the multiple may be based upon the difference in the distance traveled by the first perforated strip around the mandrel and the distance traveled by the second perforated strip around the mandrel.

In other embodiments, wherein the holes of the first perforated strip may be positioned along the latitudinal axis of the first perforated strip at an offset in relation to the holes of the second perforated strip.

The various embodiments may include holes of different shapes. The shapes may include the following: circle, elliptic, oval, quadrilateral, square, rectangle, rhombus, trapezoid, kite, diamond, triangle, pentagon, hexagon, heptagon, octagon. The shapes of the holes of the first perforated strip may be a different shape from the shape of the holes of the second perforated strip.

The light and inexpensive paint rollers are thus formed with a simplified assembly line and process, comprising:

a) a perforator;
b) feeders for the two polypropylene strips and the cover strip,
c) a heater for activating an adhesive layer or an extruder for applying an adhesive layer,
d) a stationary cooled mandrel,
e) a transport means such as a helical drive belt to form and advance the endless roller, and
f) a cutter.

Another embodiment includes a method for producing tubular products including the steps of: perforating and removing an overage from a raw substrate; collecting the overage which may be reusable in a subsequent implementation of the method; and, feeding the processed substrate onto a mandrel, thereby positioning the processed substrate to be used as a tubular product.

The embodiments comprise a novel combination that uses two strips of polypropylene material to provide an method and apparatus for making superior, light weight, and inexpensive paint rollers.

The above and other object, features and advantages of the embodiments will become more evident from the following discussion and drawings in which:

BRIEF DESCRIPTION OF THE DRAWINGS

FIG. 2 is a diagrammatic representation of the perforations/holes on the first and second perforated strips in accordance with the present invention;

FIG. 3 is a diagrammatic representation of perforations/holes that run parallel to the latitudinal axis of a perforated strip in accordance with the present invention;

FIG. 4 is a diagrammatic representation of the relative positioning of the holes on the first and the second perforated strips in accordance with the present invention;

DETAILED DESCRIPTION OF THE INVENTION AND THE PREFERRED EMBODIMENTS

Figure 1:
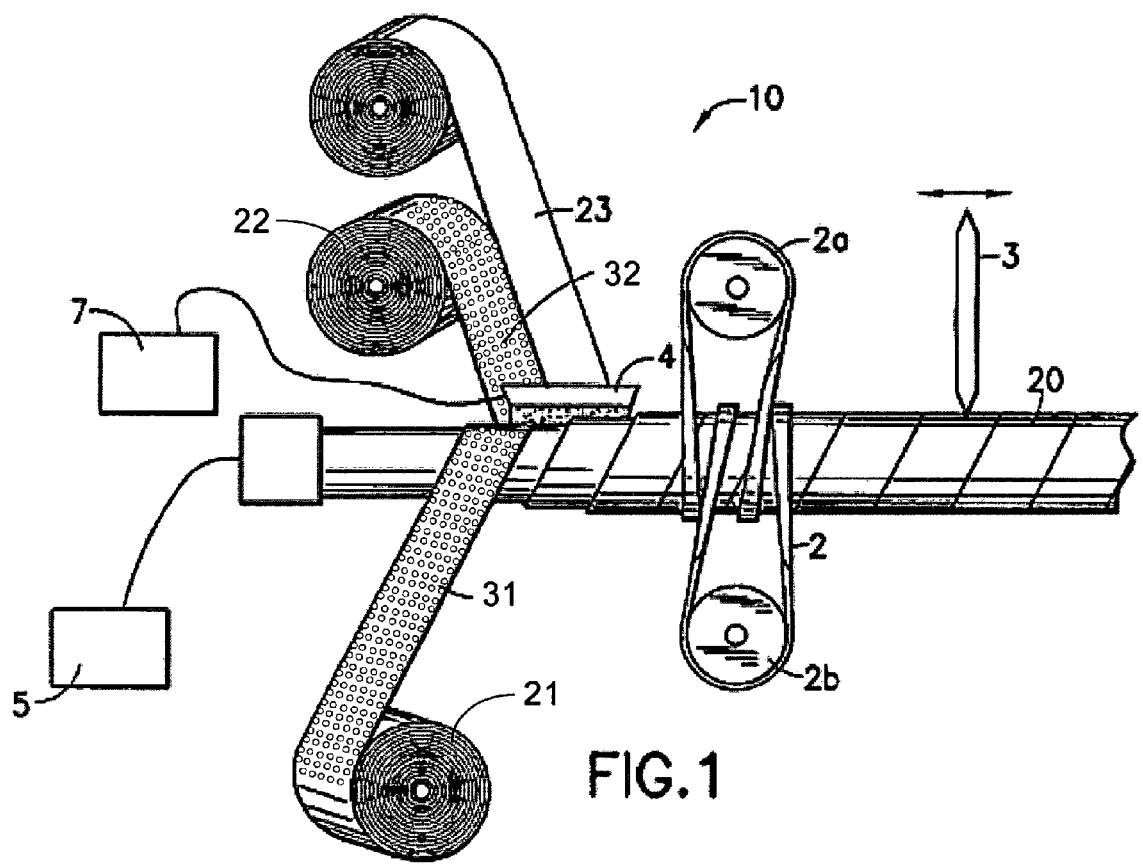
FIG. 1 is a diagrammatic representation of an apparatus suitable for making rollers in accordance with the present invention, wherein the strips are perforated.
Figure 5A:
FIG. 5(a)-5(p) are top-view diagrammatic representations of various shapes of perforations that may occur on a strip in accordance with the present invention.
Figure 5B:
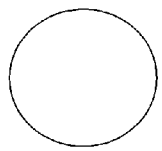
Figure 5C:
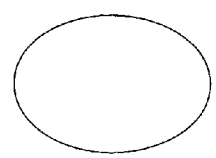
Figure 5D:
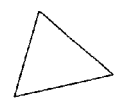
Figure 5E:
Figure 5F:
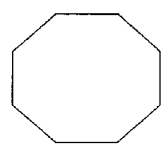
Figure 5G:
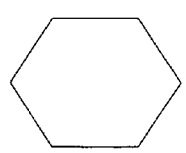
Figure 5H:
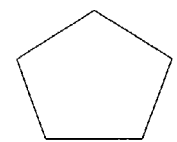
Figure 5I:
Figure 5J:
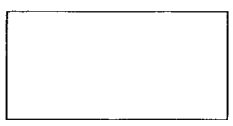
Figure 5K:
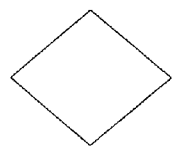
Figure 5L:
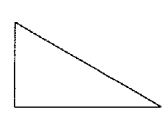
Figure 5M:
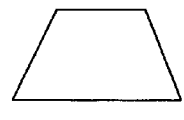
Figure 5N:
Figure 5O:
Figure 5P:

In the embodiment shown in FIG. 1, a roller forming apparatus 10 comprises a stationary mandrel 1, cooled by cooler 5, on which the roller 20 is formed, helical drive belt 2 moves by between drive rollers 2a and 2b to turn and move the formed endless roller 20 along the mandrel 1 to a fly-away cutter 3. A paint roller is manufactured from an inner strip of thermoplastic material 21, an outer strip of thermoplastic material 22, a cover 23, and an adhesive 6 applied from one or more heads 4. The thermoplastic material is preferably polypropylene. The strips 21, 22 have been perforated and contain holes 31, 32, respectively. The cover 23 may be a well-known fabric cover for a paint roller, which can be made of polyester.

For ease of discussion in this application, the term "downstream" refers to the direction further along in the roller manufacturing process, or nearer the fly-away cutter 3, while the term "upstream" refers to the direction earlier in the roller manufacturing process, or further from the fly-away cutter 3.

The inner strip 21 is helically advanced about the mandrel 1. The term helically as used herein means oriented about a mandrel so as to permit the downstream edge of a given wind of a strip to be in closely-spaced or abutting relation with the upstream edge of the preceding wind of the strip. As is well known in the art, a lubricant such as 5% mineral oil may be applied to the inner surface of the inner strip 21 prior to winding on the mandrel 1.

The outer strip 22 is helically advanced about the inner strip 21. The edges of the outer strip 22 may be offset from the edges of the inner strip 21 as the two strips are advanced along the mandrel 1. The offset between outer strip 22 and inner strip 21 causes outer strip 22 to overlap the portion of the inner strip 21 where its upstream and downstream edges are in closely-spaced or abutting relation. It is believed that the a stronger product is yielded from having an offset between the inner strip 21 and the outer strip 22. An offset of between one-quarter and three-quarters of the width of the inner strip 21 is found to achieve acceptable results.

The cover 23 is helically advanced about the outer strip 22.

The head 4 provides a layer of adhesive material 6 from a source of such material 7, the adhesive material 6 is preferably polypropylene. The source of adhesive material 7 is preferably an extruder, but may be any source of adhesive material including a melter. The head 4 may be any type of head appropriate for providing adhesive material 6 from the source, such as a nozzle or a die. In certain embodiments, where the source 7 is an extruder, the head 4 is preferably a die.

Prior to the hardening and setting of the adhesive material 6, the belt drive 2 applies pressure to the outer surface of the cover 23, imparting inward forces on the component parts, and thereby forming the continuous roller about the mandrel. In addition to forming the roller, the belt drive 2 advances the thus-formed endless roller along the mandrel, and continuously rotates the endless roller, thereby also advancing the strips 21, 22 and the cover 23 toward and around the mandrel.

The width and thickness of the strips 21, 22, and the cover 23 width and pile may be those that are appropriate for manufacture of the desired roller. For example, a typical high quality roller having a 1.5-inch diameter core and a 60-wall can be manufactured with the following materials:

|  | Width | Thickness |
| --- | --- | --- |
| Inner Strip | 2.750" | 0.015" |
| Adhesive Layer One | 2.750" | 0.015" |
| Outer Strip | 2.750" | 0.015" |
| Adhesive Layer Two | 2.750" | 0.015" |
| Cover | 2.875" | Desired Pile |

As used herein, the term "wall" or "mil" means thickness in thousandths of an inch. Such widths and thickness and the methods of determining them are well known in the art. It will be apparent to one of skill in the art that almost infinite variation is possible depending upon the characteristics of the desired roller.

The amount of adhesive should depend to some extent on the cover 23 material. A head 4 may be used that is significantly shorter than the preferred width. Although this embodiment will accommodate a rather large variation in the width of the head 4, and therefore in the width of material that is supplied by the head 4, it is believed that using a head 4 that provides the desired width of adhesive onto the strips 21, 22 will yield the most consistent results. It is further possible, without departing from the invention, to use more than one head to apply the adhesive to advance between the strips 21, 22 and to advance between the cover 23 and the outer strip 22. Regardless of the width or number of heads, in order to produce a quality laminated continuous roller, pressure must be applied inwardly upon the cover before the two layers of polypropylene are permitted to harden and set.

As the adhesive material 6 is applied, the holes 31, 32 may be filled or partially filled. As a result, the adhesive material 6 may contact the mandrel 1. However, embodiments may avoid problems when the mandrel 1 is kept cool by the cooler 5. In addition, problems can be avoided by keeping the process swift so that the rollers quickly advance off of the spinning mandrel 1.

In this embodiment, the orientation for feeding the strips 21, 22 and the cover 23, as shown in FIG. 1, permits the cover 23 to be advanced toward the mandrel 1 adjacent and parallel to the outer strip 22. Such positioning permits the use of a single head 4 that can apply adhesive 6 to the outer surface of the inner strip 21 and to the outer surface of the outer strip 22 simultaneously. Additionally, this positioning permits the adhesive 6 to be applied uniformly and then sandwiched between the inner and outer strips 21, 22 or the outer strip 22 and the cover 23. Further, this positioning permits a very short assembly line for the continuous manufacturing process.

As is well known in the art, the endless roller 20 may be cut by the fly-away saw 3 into lengths after it has set sufficiently. Employing the present embodiment, the entire length of the assembly line required to manufacture superior quality paint rollers can have less than 20 inches of mandrel 1, and less than 20 inches between the belt drive 2 and the fly-away saw 3.

FIG. 2 shows perforated strips 21, 22 comprising different shapes and positioning of holes 31, 32. Note that embodiments may vary as to the number of holes 31, 32 staggered across the width of perforated strips 21, 22. In addition, the positioning of the holes 31, 32 may vary. The holes 31, 32 may be placed in a straight, zigzag, or random manner as the strips 21, 22 are perforated. Also, the holes 31, 32 may be positioned in an uniform direction relative to the longitudinal axis of the strip 21, 22. The direction may be perpendicular or slightly angled. In addition, the direction may curved or random in relation to the longitudinal axis of the strips 21, 22. Furthermore, the shapes of the holes 31 of the first perforated strip 21 may be different from the shape of the holes 32 of the second perforated strip 22.

FIG. 3 illustrates the positioning of the holes 31, 32 on the perforated strips 21, 22 in accordance with certain embodiments. In one embodiment the diameter of the holes 31, 32 is 0.125 inches. In addition, the holes 31, 32 be round or oval. The width of the strips 21, 22 may be 2.75 inches. Further, there may be 10 or 11 holes 31, 32 staggered across the width of the strips 21, 22. It will be apparent to one of skill in the art that almost infinite variation is possible. Some strips 21, 22 may have 6 or 7 holes 31, 32 staggered across the width of the strips 21, 22. Certain embodiments may yield a 50% reduction in the use of polypropylene strip material in the finalized paint rollers.

FIG. 4 illustrates that, relative to the longitudinal axis of the strips 21, 22, the direction of the holes 31 of the first perforated strip 21 may be different from the direction of the holes 32 of the second perforated strip 22. Such variation between the placement of the holes 21, 22 on the two strips 31, 32 may provide a decrease in overlap amongst the holes 31, 32 when the second strip 22 is wound over the first strip 21.

In certain embodiments, the amount of overlap between the holes 31, 32 would be minimized. However, the embodiments may encompass any amount of overlap. An objective of certain embodiments may concern the balancing of the amount of polypropylene material removed from the strips 21, 22 and the overall strength of the finalized paint rollers. The goal may be to reduce the cost of material without compromising the quality of the rollers.

The overlap of the holes 31, 32 may be reduced by predetermining the placement of the holes 31 on the first strip 21 in relation to the holes 32 on the second strip 32. The length of the first strip 21 that is required to helically advance about the mandrel 1 may be determined based upon the circumference of the mandrel 1. In addition, the length of the second strip 22 that is required to helically advance about the first strip 21 may determined based upon the circumference of the mandrel 1 and the thickness of the first strip 21. Based upon the placement of the holes 31 at certain predetermined intervals on the first strip 21, the holes 32 on the second strip 22 may be placed at certain intervals corresponding the holes 31 on the first strip 21. The corresponding intervals on the second strip 22 may be a certain multiple of the predetermined intervals on the first strip 21. Such embodiments may control the amount of overlap of the holes 31, 32 by changing the intervals of the holes 31, 32 respective of each other.

Other embodiments may reduce the amount of overlap of the holes 31, 32 by alternating the position of the holes 31 on the first strip 21 in relation to the holes 32 on the second strip 32 in a zigzag pattern. Other variations of patterns may also be established to control the amount of overlap. It is understood that the pattern may vary without departing from the scope of the present invention.

An unexpected benefit of the above embodiments is that the cost is less than the cost for manufacturing a comparable roller using strips 21, 22 that are not perforated. It is expected that adhesive material 6 may fill all or a portion of the holes 31, 32; and the adhesive material 6 is preferably a type of polypropylene. However, the adhesive material 6 is generally less expense than the price of polypropylene strips 21, 22. Hence, the finalized paint roller with cores made from perforated strips 21, 22 has a reduced cost of polypropylene, even if the holes 31, 32 are completely filled with adhesive material 6. The cost benefit results from the fact that polypropylene in strip form is more expensive by the pound than polypropylene in pellet form, which latter form is used in an extruder to form the adhesive material 6. Additionally, the adhesive material 6 may be composed of a cheaper lower-grade resin such as off-grade industrial seconds. In some embodiments, less adhesive material 6 may be required because the byproduct may be reclaimed. Thus, a strong yet less expensive roller can be produced.

FIG. 5 illustrates the various shapes of the holes 31, 32 that may be created by perforating the strips 21, 22. The embodiments may include any of the following shapes: circle, elliptic, oval, quadrilateral, square, rectangle, rhombus, trapezoid, kite, diamond, triangle, pentagon, hexagon, heptagon, or octagon. This list is non-exhaustive and the shapes of the hole 31, 32 may include obvious variations. Certain embodiments may include a round shape, such as a circle, an ellipse, or an oval. Such rounded shapes enhance the strength of the strips 21, 22 and of the final paint roller because their arcs allow for the superior distribution of any external forces.

Figure 6A:
FIG. 6(a)-(c) are cross-sectional side-view diagrammatic representations of various shapes of perforations that may occur on a strip in accordance with the present invention.
Figure 6B:
Figure 6C:

FIG. 6 shows the cross-sectional view of the holes/perforations 31, 32. The holes/perforations 31, 32 translate completely through the strip 21, 22. This list is non-exhaustive, and the cross-sectional shapes of the holes/perforations 31, 32 may include obvious variations.

Figure 7:
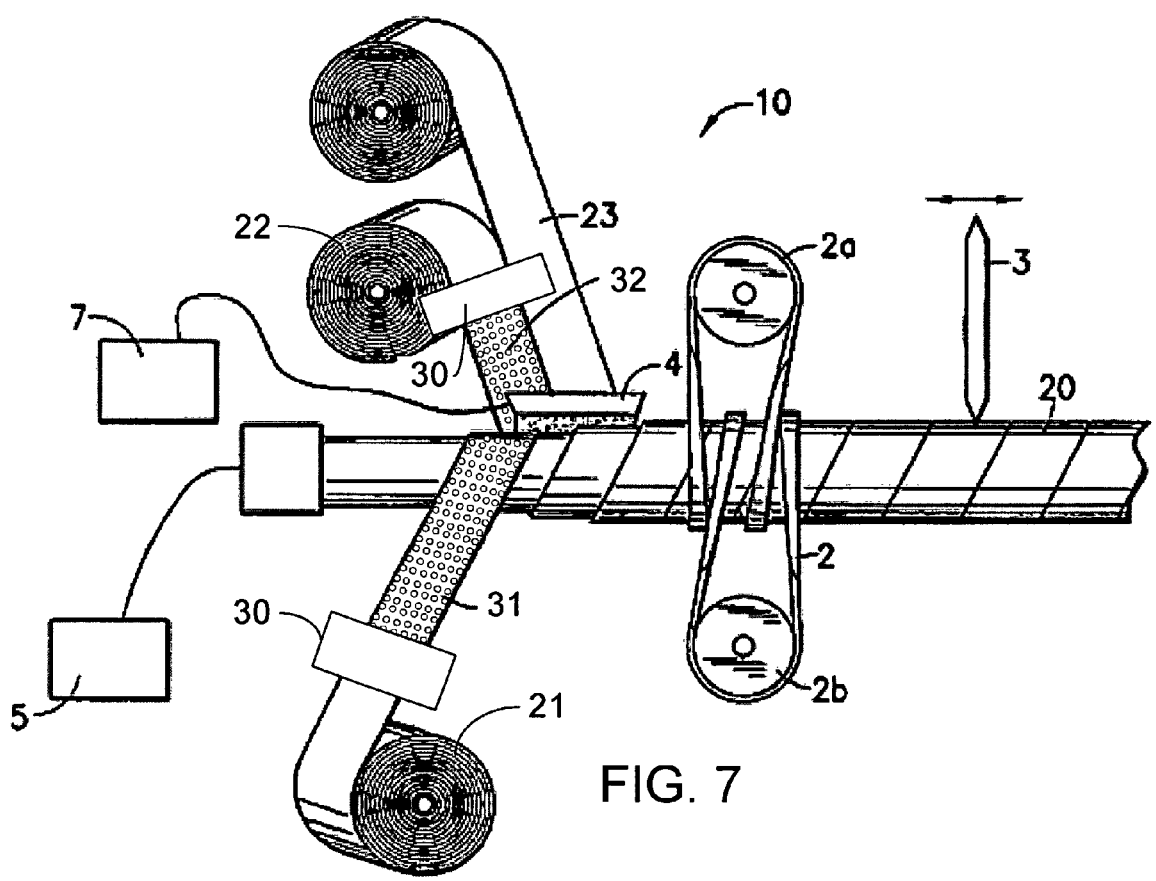
FIG. 7 is a diagrammatic representation of an apparatus with a perforator suitable for making rollers in accordance with the present invention.
Figure 8:
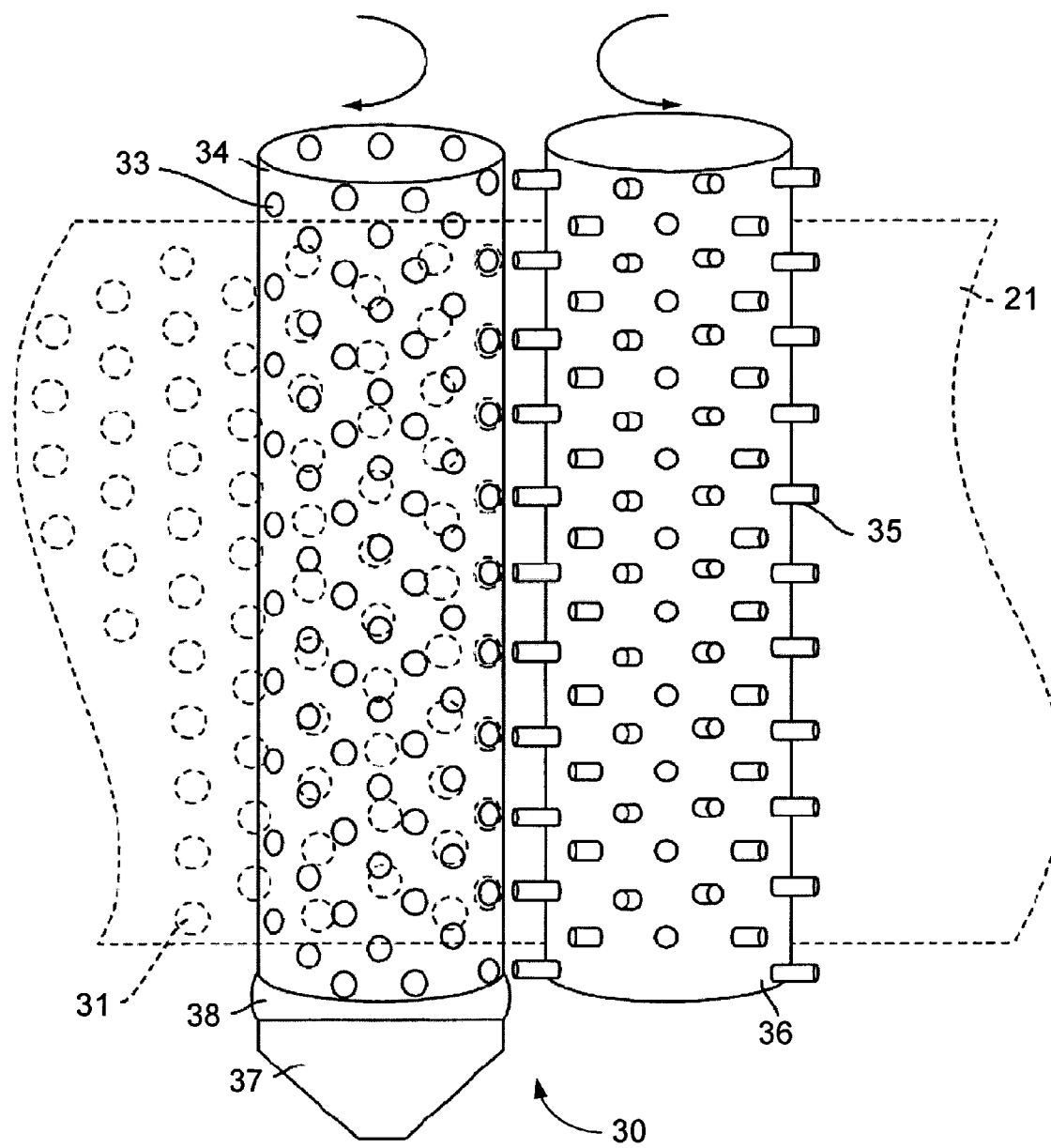
FIG. 8 is an enlarged representation of the perforator and the vacuum in accordance with the present invention.
Figure 9:
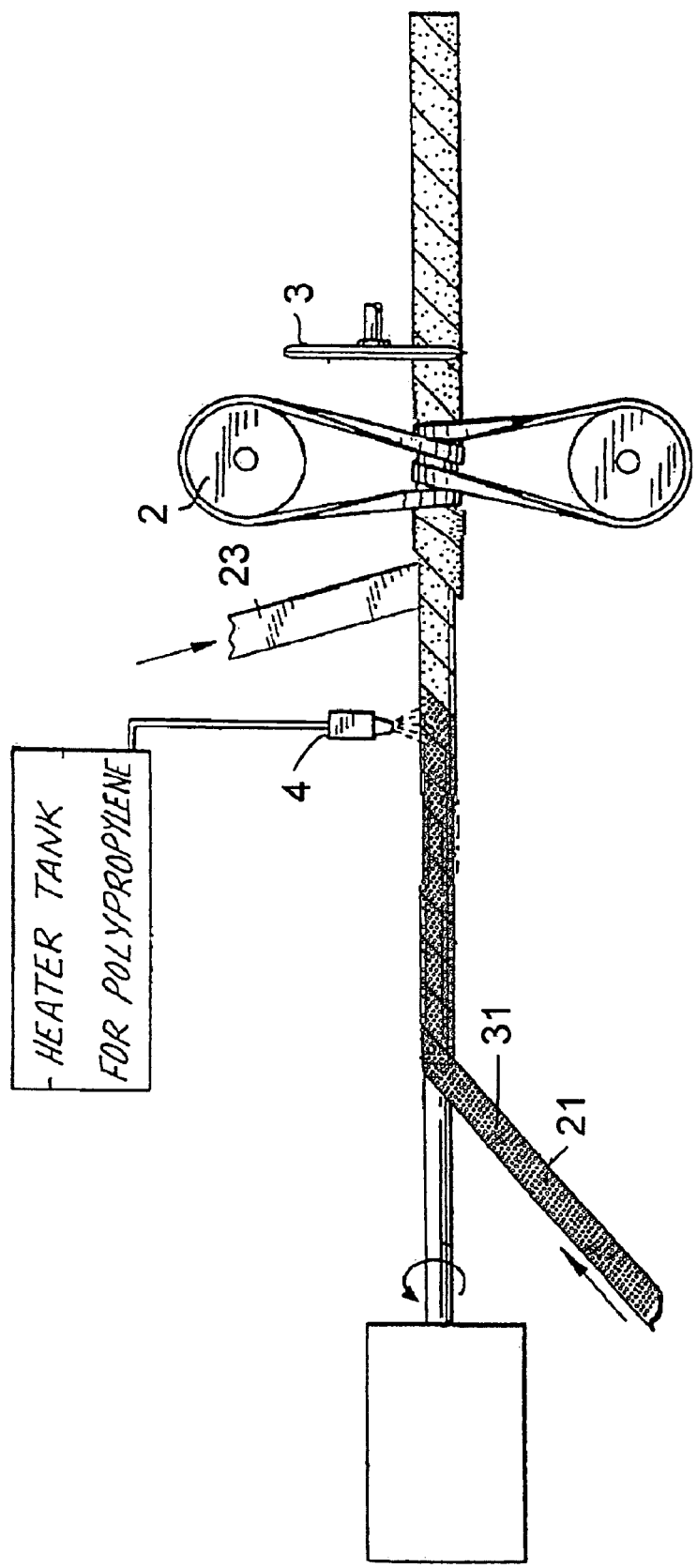
FIG. 9-22 are diagrammatic representations of apparatuses suitable for making rollers in accordance with the present invention.
Figure 10:
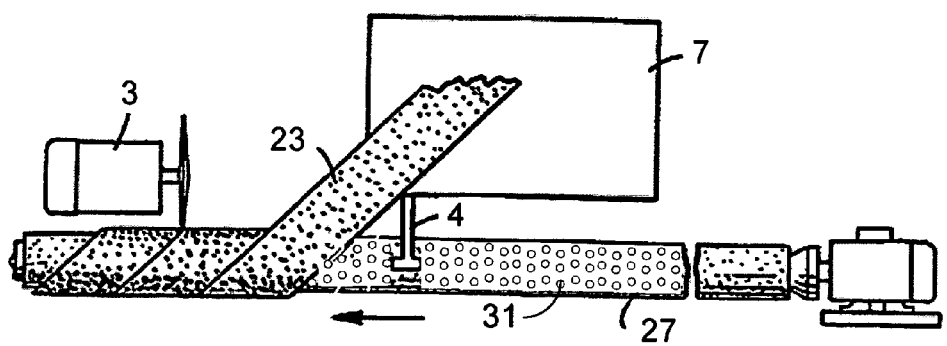
Figure 11:
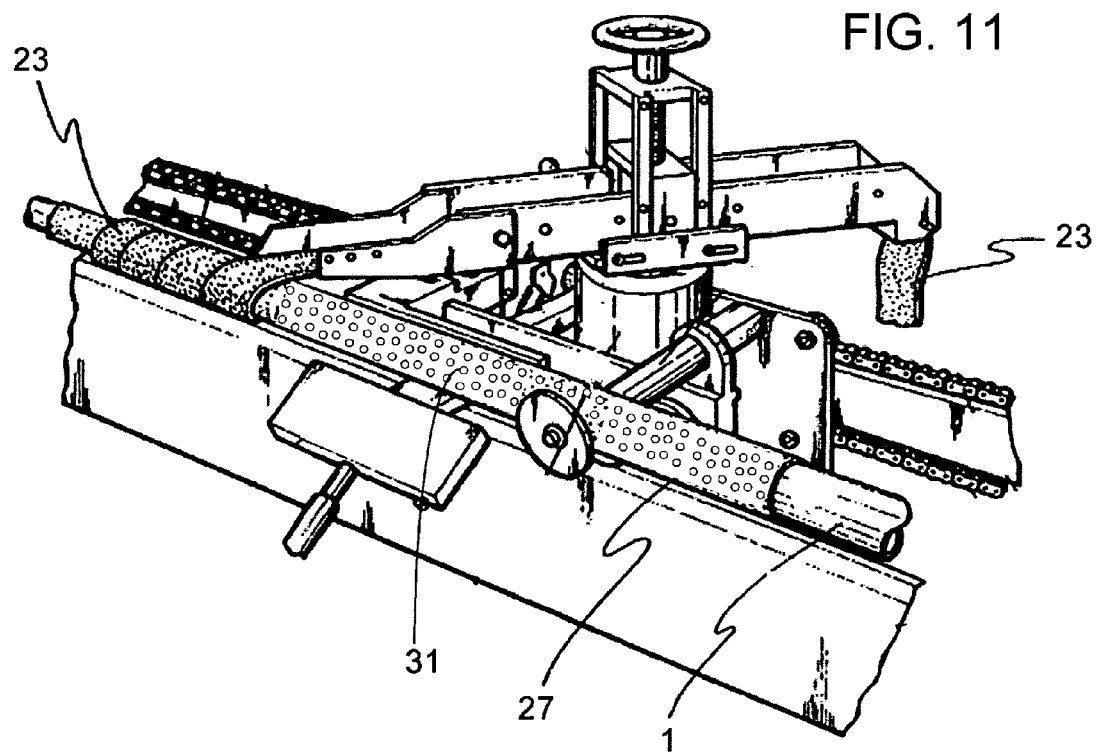
Figure 12:
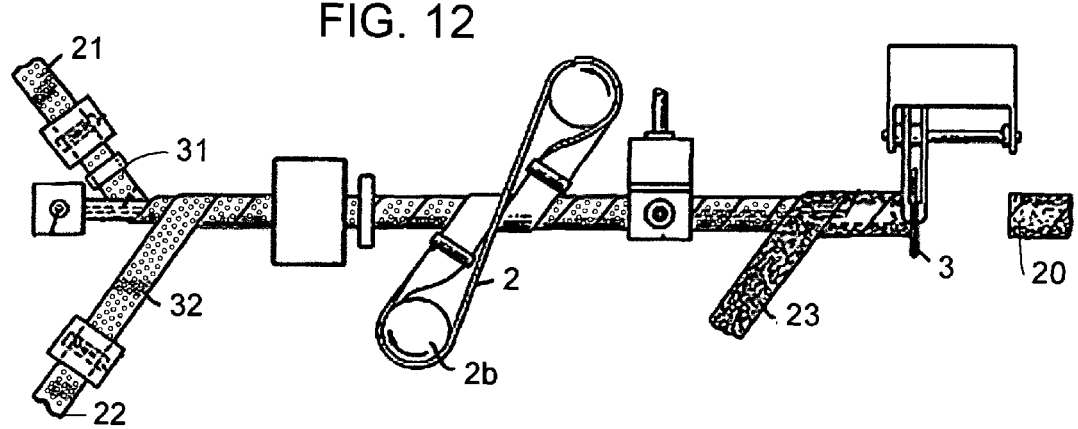
Figure 13A:
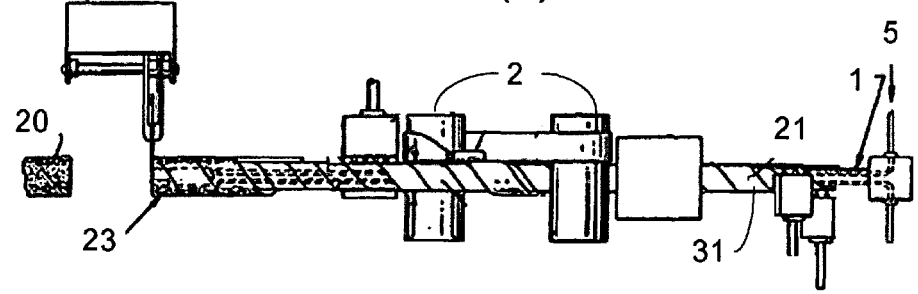
Figure 13B:
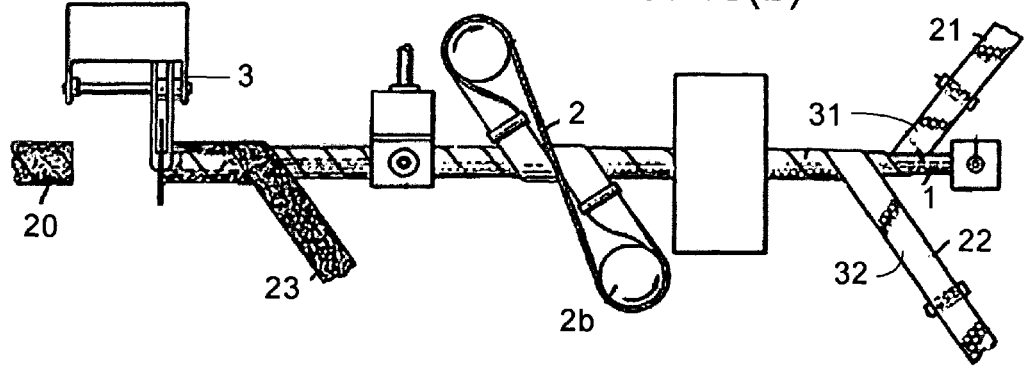
Figure 14A:
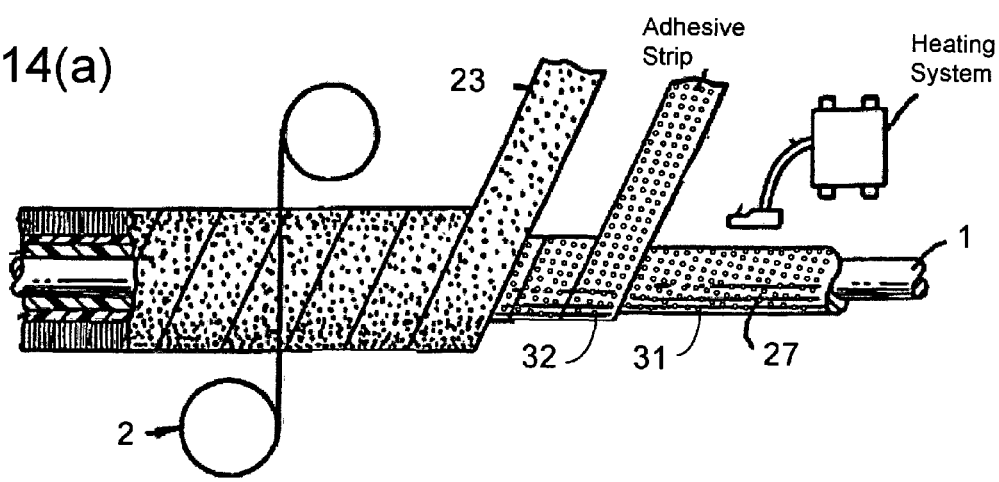
Figure 14B:
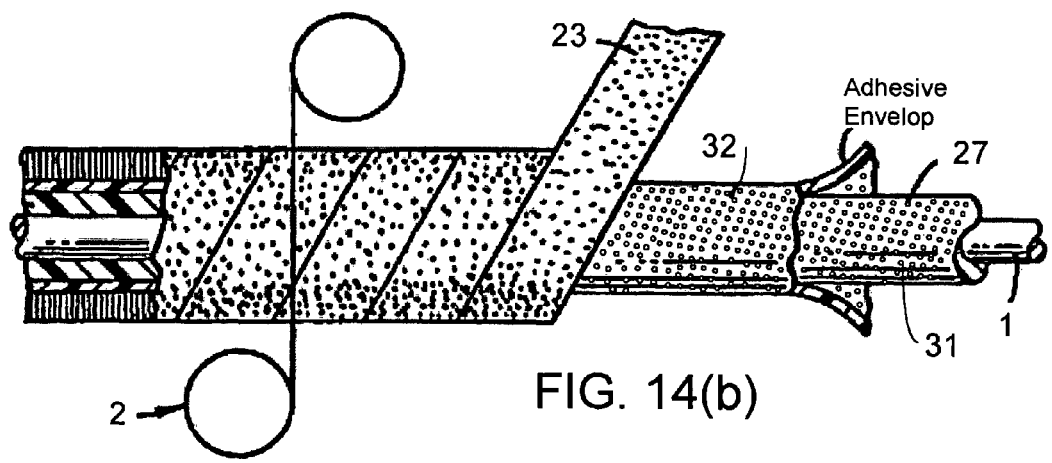
Figure 15:
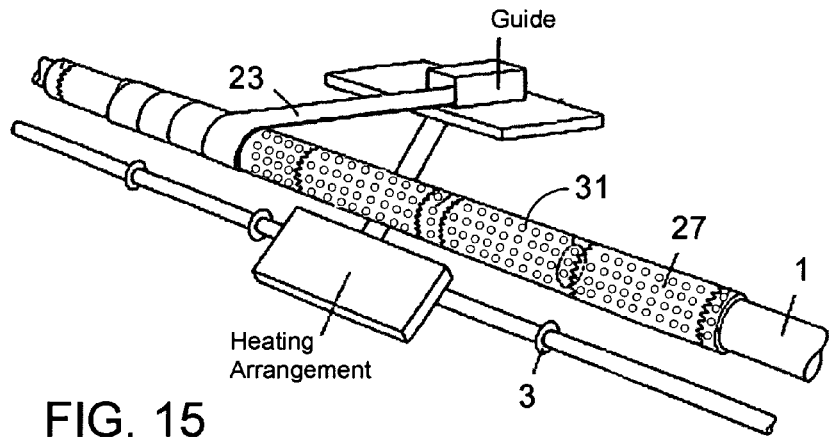
Figure 16:
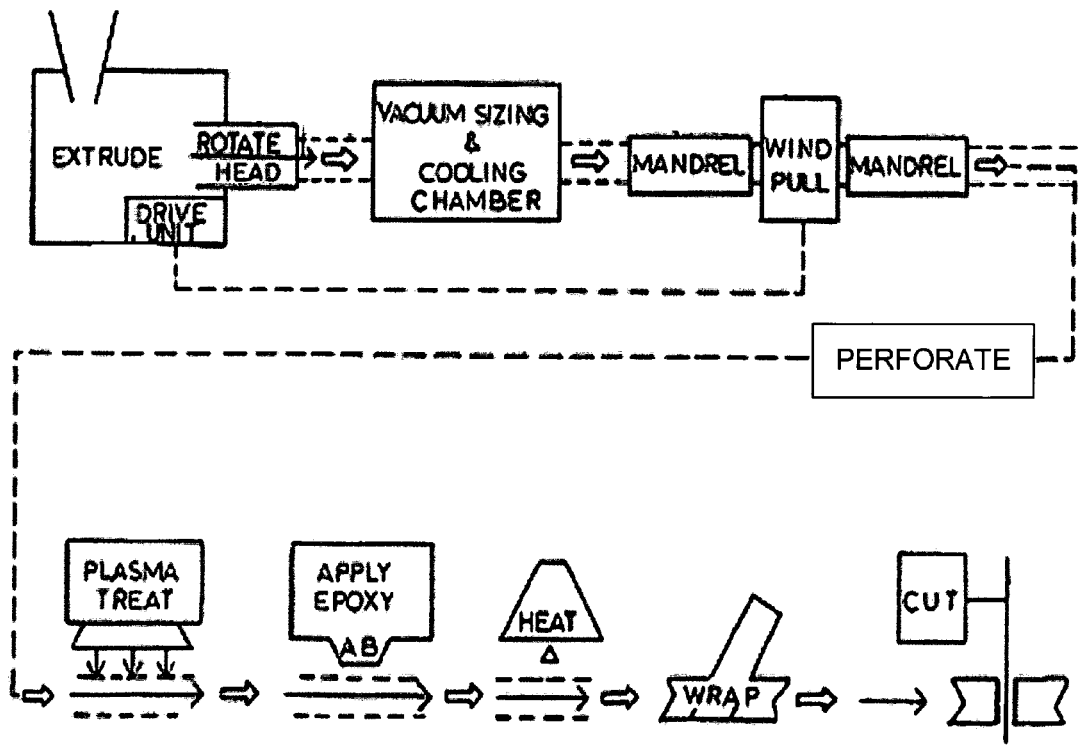
Figure 17:
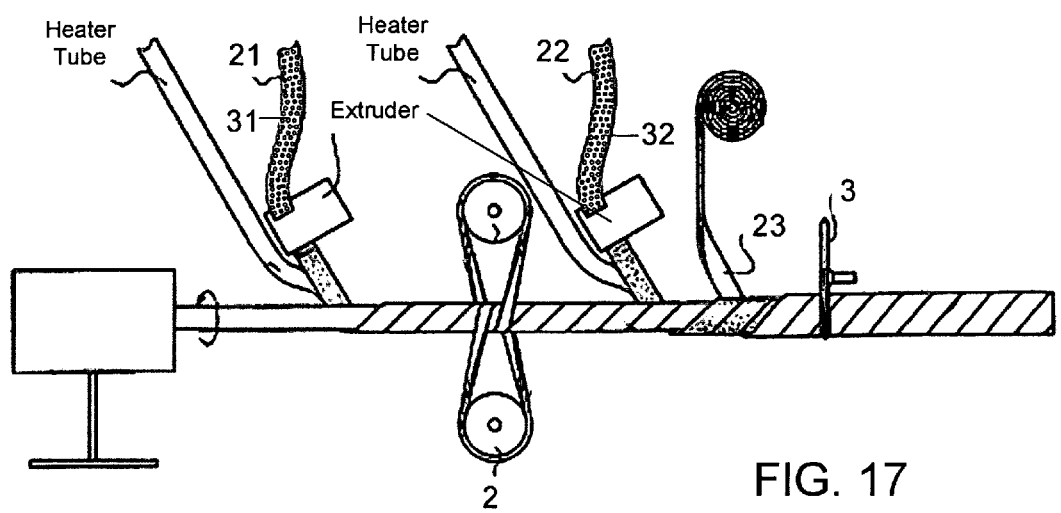
Figure 18:
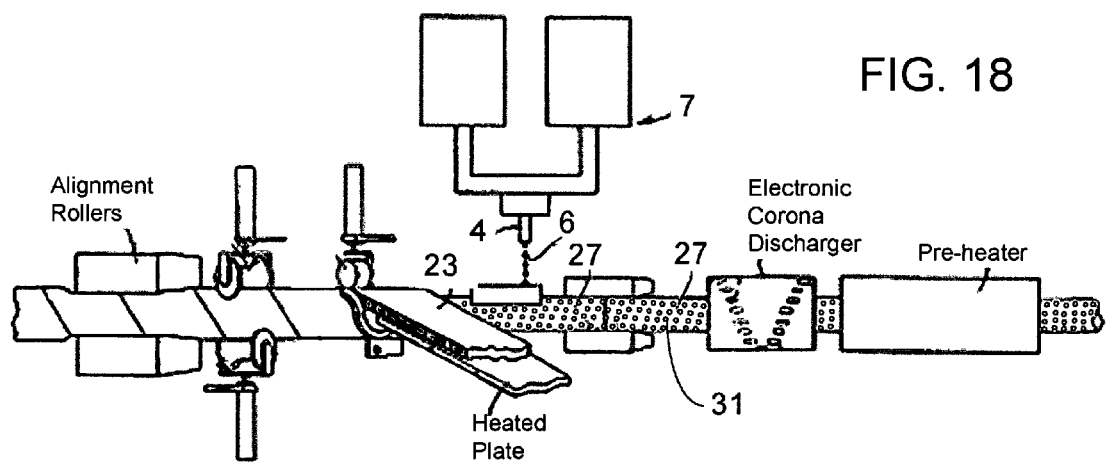
Figure 19:
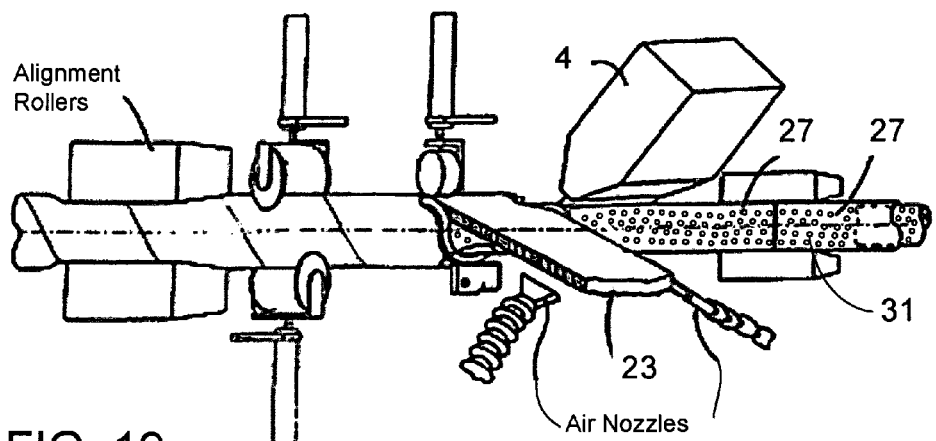
Figure 20:
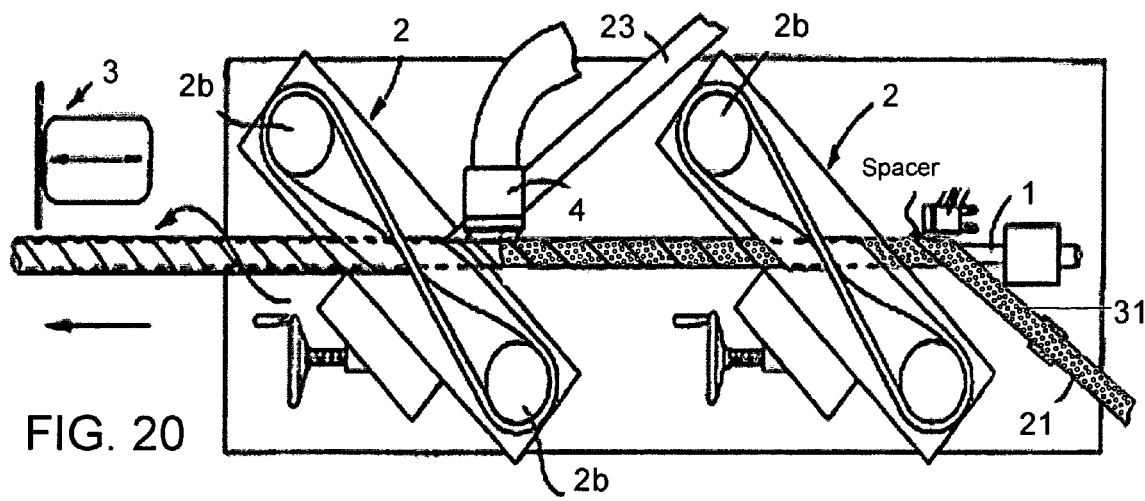
Figure 21:
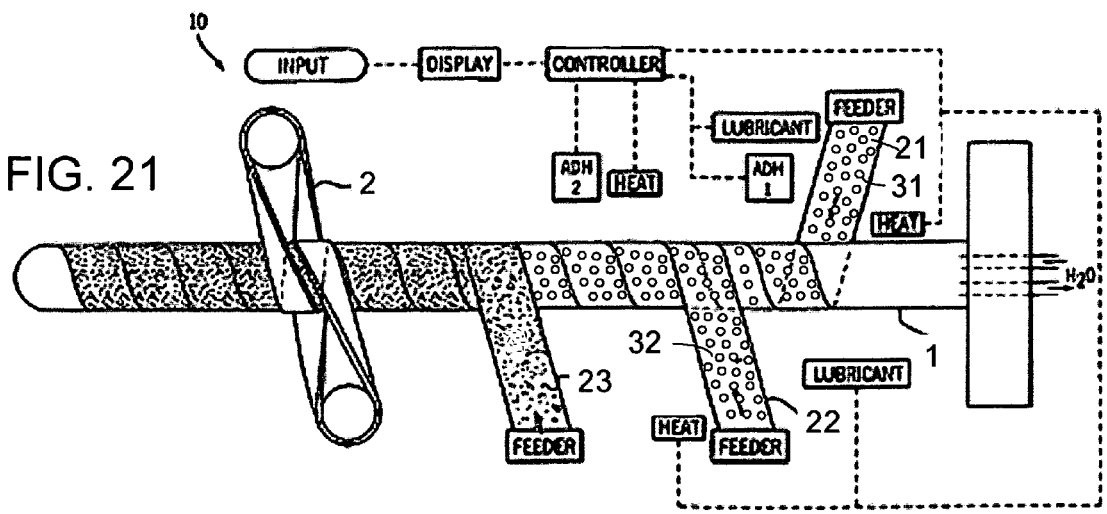
Figure 22:
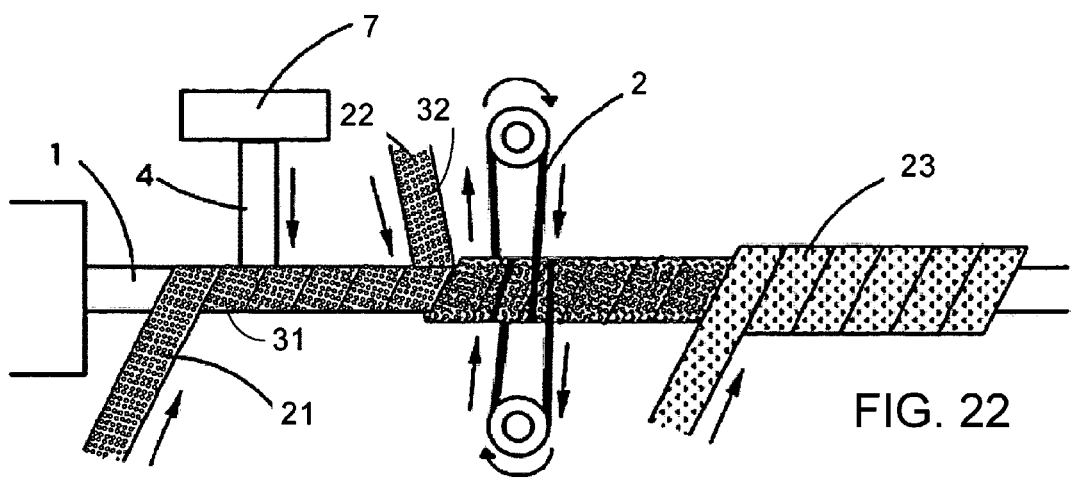

As shown in FIG. 7, certain embodiments may include a perforator 30 for perforating polypropylene strips 21, 22. The convenient and conventional method of perforating such strips 21, 22 is to punch through them or die-cut them with a mechanical punching means. As shown in FIG. 8, an embodiment may include a rotary die 30 comprising of one cylinder 36 with punches/spikes 35 and another cylinder 34 with corresponding apertures 33. As the strips 21, 22 pass between the two cylinders 34, 36, the points of the punches/spikes 35 pierce through the strips 21, 22 and engage/enter the apertures 33. As a result, the strips 21, 22 are perforated. Either or both of the strips 21, 22 may be perforated.

Polypropylene byproduct may be produced and collected as the polypropylene strips 21, 22 pass through the rotary die 30 and the punches/spikes 35 pierce through the polypropylene strips 21, 22. A vacuum 37 may assist in collecting the polypropylene byproduct. A washer/bearing 38 may be placed between the vacuum 37 and the bottom of the second cylinder 34 of the rotary die 30. In some embodiments, the collected byproduct may be sold. In other embodiments, the collected byproduct may be reclaimed by melting it so that is may be added to the source of adhesive material 7, such as an extruder. Once the collected byproduct is converted into the adhesive material 6, it may be applied from the head 4 in a subsequent implementation of such an embodiment.

FIG. 9-22 show additional embodiments suitable for making rollers from strips 21, 22 and/or core/tubes 27 that are perforated. This list is non-exhaustive, and obvious variations may be included. For example, any of the strips 21, 22 and/or core/tubes 27 used in these embodiments may contain any variation of holes/perforations 31, 32. Although some strips 21, 22 may have holes/perforations 31, 32, other strips 21, 22 used in the same apparatus need not include any holes/perforations 31, 32. Moreover, certain versions of these embodiments may use strips 21, 22 and/or core/tube 27 that are already perforated, while other versions of these embodiments may also perform the step of producing holes/perforations 31, 32 on the strips 21, 22 and/or core/tube 27.

These additional embodiments depicted in FIG. 9-22 illustrate the modifications of the apparatuses that are further described in the following U.S. patents and applications: U.S. Pat. No. 5,572,790 (Sekar) Nov. 12, 1996; U.S. Pat. No. 5,397,414 (Garcia) Mar. 14, 1995; U.S. Pat. No. 5,614,047 (Garcia) Mar. 25, 1997; U.S. Pat. No. 5,468,207 (Bower) Nov. 21, 1995; U.S. Pat. No. 5,206,968 (Bower) May 4, 1993; U.S. Pat. No. 6,203,648 (Barton) Mar. 20, 2001; U.S. Pat. No. 6,176,956 (Hansen) Jan. 23, 2001; U.S. Pat. No. 2001/0015252A1 (Tams et al.) Aug. 23, 2001; U.S. Pat. No. 6,145,196 (Ripstein) Nov. 14, 2000; U.S. Pat. No. 6,199,279 (Humphrey et al.) Mar. 13, 2001; U.S. Pat. No. 6,231,711 B1 (Roberts et al.) May 15, 2001; U.S. Pat. No. 6,539,999 B2 (Polzin et al) Apr. 1, 2003; and, No. 2007/0056132 A1 (Yamaguchi et al) Mar. 15, 2007. Each of these patents and references are incorporated by reference.

The above embodiments and preferences are illustrative of the present invention. It is neither necessary, nor intended for this patent to outline or define every possible combination or embodiment. The inventor has disclosed sufficient information to permit one skilled in the art to practice at least one embodiment of the invention, and has disclosed the ways the inventor now believes are the best ways to practice the invention. The most obvious variations to the present invention include variation in the size and shape of the holes 31, 32 and variations in the placement of the holes 31, 32. It is understood that the above description and drawings are merely illustrative of the present invention and that changes in components, structure and procedure are possible without departing from the scope of the present invention as defined in the following claims.

What is claimed is:

1. A method for producing tubular products comprising the steps of:

perforating and removing an overage from a raw thermoplastic substrate, wherein the removal of the overage results in a reduction in the weight of the substrate;

collecting the overage, wherein the overage is reusable in a subsequent implementation of the method; and, feeding the processed thermoplastic substrate onto a mandrel, wherein the processed thermoplastic substrate substantially contacts the mandrel, thereby positioning the processed thermoplastic substrate to be used as a tubular product.

2. A method for producing a paint roller comprising the steps of:
feeding a perforated thermoplastic substrate about a mandrel, wherein the perforated thermoplastic substrate substantially contacts the mandrel, thereby positioning the perforated thermoplastic substrate to be used as a paint roller core, wherein the perforated thermoplastic substrate has a plurality of holes;
applying adhesive upon the outer surface of the perforated thermoplastic substrate;
applying and bonding a cover about the perforated thermoplastic substrate, thereby covering the adhesive on the outer surface of the perforated thermoplastic substrate; and,
applying a compressing force upon the cover urging the cover toward the perforated thermoplastic substrate, thereby creating the paint roller.

3. The method of claim 2, wherein the perforated thermoplastic substrate is a perforated polypropylene strip.

4. A method for producing a paint roller comprising the steps of:
processing a raw thermoplastic substrate by perforating and removing a thermoplastic overage from the raw thermoplastic substrate, wherein the removal of the overage results in a reduction in the weight of the paint roller, and
collecting the overage, wherein the overage is reusable in a subsequent implementation of the method;
feeding the processed thermoplastic substrate onto a mandrel, wherein the processed thermoplastic substrate substantially contacts the mandrel, thereby positioning the processed thermoplastic substrate to be used as a paint roller core; and,
applying and bonding a cover about the paint roller core, thereby creating the paint roller.

5. The method of claim 4, furthering comprising the step of:
reclaiming the thermoplastic overage, thereby reusing the overage in the subsequent implementation of the method.

6. The method of claim 4, furthering comprising the step of:
selling the thermoplastic overage, thereby recouping a portion of an expenditure spent for producing the paint roller.

7. The method of claim 4, wherein the raw thermoplastic substrate is a polypropylene strip.

8. The method of claim 7, wherein the thermoplastic overage is a polypropylene byproduct, wherein the step of removing the polypropylene byproduct from the polypropylene strip comprises the step of perforating the polypropylene strip, wherein the perforated strip has a plurality of holes, and wherein the polypropylene byproduct comprises of a removed portion of the polypropylene strip that was removed from the location of the plurality of holes of the polypropylene strip.

9. The method of claim 8, wherein the step of perforating the polypropylene strip comprises the steps of:
feeding the polypropylene strips through a rotary die, wherein the rotary die has a first cylinder and a second cylinder, wherein the polypropylene strips pass between the two cylinders, wherein the first cylinder has a plurality of punches/spikes, wherein the second cylinder has a plurality of corresponding apertures;
punching the polypropylene strips, wherein the plurality of punches/spikes pierce the polypropylene strips, wherein the plurality of punches/spikes engage with the plurality of corresponding apertures, thereby forming the plurality of holes in the polypropylene strips.

10. The method of claim 8, wherein the shape of at least one hole of the plurality of holes is a shape selected from the group consisting of circle, elliptic, oval, quadrilateral, square, rectangle, rhombus, trapezoid, kite, diamond, triangle, pentagon, hexagon, heptagon, octagon.

11. The method of claim 9, wherein the step of collecting the overage comprises the steps of:
vacuuming the polypropylene byproduct, wherein the polypropylene byproduct is punched out as the polypropylene strips pass through the rotary die and the plurality of punches/spikes pierce through the polypropylene strips, wherein a vacuum is adjacent to the bottom of the second cylinder of the rotary die.

12. The method of claim 7, wherein the step of feeding the processed substrate onto the mandrel comprises the steps of:
feeding a first perforated strip of polypropylene about the mandrel;
feeding a second perforated strip of polypropylene about the first perforated strip of polypropylene in offset relation therewith; and
applying adhesive upon, at least:
a portion of the outer surface of one wind of the first perforated strip,
an adjacent portion of the outer surface of a subsequent wind of the first perforated strip, and
substantially all of the outer surface of a wind of the second perforated strip.

13. The method of claim 12, wherein the step of applying and bonding the cover comprises the steps of:
feeding the cover about the second perforated strip; and
applying a compressing force upon the cover urging the cover toward the second perforated strip and simultaneously urging the second perforated strip toward the first perforated strip, thereby creating the paint roller.

14. The method of claim 13, further comprising the step of:
aligning the first perforated strip and the second perforated strip,
wherein the plurality of holes of the first perforated strip overlie the plurality of holes of the second perforated strip, and
wherein the percentage of the surface area of the plurality of holes of the first perforated strip that overlaps with the surface area of the plurality of holes of the second perforated strip is less than 50%.

15. The method of claim 14, wherein the diameter of each hole of the plurality of holes is approximately 0.125 inches, and approximately 6 holes of the plurality of holes are staggered across the width of each perforated strip.

16. The method of claim 12,
wherein the plurality of holes of the first perforated strip are spaced at a predetermined interval along the longitudinal axis of the first perforated strip,
wherein the plurality of holes of the second perforated strip are spaced at a corresponding interval along the longitudinal axis of the second perforated strip, wherein the corresponding interval of the plurality of holes of the second perforated strip is a multiple of the predetermined interval of the plurality of holes of the first perforated strip, and wherein the multiple is based upon the difference in the distance traveled by the first perforated strip around the mandrel and the distance traveled by the second perforated strip around the mandrel.

17. The method of claim 12, wherein the plurality of holes of the first perforated strip are positioned along the latitudinal axis of the first perforated strip at an offset in relation to the plurality of holes of the second perforated strip.

18. The method of claim 12, wherein the shape of the plurality of holes of the first perforated strip are a different shape from the shape of the plurality of holes of the second perforated strip.

19. The method of claim 13, further comprising the step of:
cutting the paint roller into lengths.

20. The method of claim 4, wherein the strength of the paint roller is not detrimentally compromised by the removal of the overage.

* * * * *